United States Patent
Goyal

(10) Patent No.: US 11,188,881 B2
(45) Date of Patent: Nov. 30, 2021

(54) DYNAMIC USER INTERFACE

(71) Applicant: TimeTrade Systems, Inc., Tewksbury, MA (US)

(72) Inventor: Mukul Goyal, Tewksbury, MA (US)

(73) Assignee: TIMETRADE SYSTEMS, INC., Tewksbury, MA (US)

( * ) Notice: Subject to any disclaimer, the term of this patent is extended or adjusted under 35 U.S.C. 154(b) by 71 days.

(21) Appl. No.: 16/561,429

(22) Filed: Sep. 5, 2019

(65) Prior Publication Data
US 2020/0126044 A1    Apr. 23, 2020

Related U.S. Application Data

(60) Provisional application No. 62/748,708, filed on Oct. 22, 2018.

(51) Int. Cl.
| G06F 3/048 | (2013.01) |
| G06Q 10/10 | (2012.01) |
| G06F 3/16 | (2006.01) |
| G06F 3/0488 | (2013.01) |
| G06F 3/0481 | (2013.01) |

(52) U.S. Cl.
CPC ..... *G06Q 10/1095* (2013.01); *G06F 3/04817* (2013.01); *G06F 3/04886* (2013.01); *G06F 3/167* (2013.01)

(58) Field of Classification Search
CPC . G06Q 10/1095; G06F 3/167; G06F 3/04886; G06F 3/04817
See application file for complete search history.

(56) References Cited

U.S. PATENT DOCUMENTS

| 6,633,315 | B1 | 10/2003 | Sobeski et al. |
| 7,108,173 | B1 | 9/2006 | Wang et al. |
| 7,620,894 | B1 | 11/2009 | Kahn |
| 7,802,206 | B1 | 9/2010 | Davis et al. |
| 8,418,065 | B2 | 4/2013 | Conley et al. |
| 9,243,911 | B2 * | 1/2016 | Coughlin ............ G01C 21/362 |
| 10,019,695 | B2 * | 7/2018 | Wong ................... H04L 67/325 |
| 2004/0158568 | A1 * | 8/2004 | Colle ..................... G06Q 10/06 |
| 2007/0168447 | A1 * | 7/2007 | Chen .................... G06Q 10/107 |
| | | | 709/207 |
| 2008/0168113 | A1 * | 7/2008 | Hickling ............. G06Q 10/109 |
| | | | 708/112 |
| 2013/0096937 | A1 * | 4/2013 | Campbell ............ G06Q 10/10 |
| | | | 705/2 |
| 2013/0191896 | A1 * | 7/2013 | Adderly ............... H04W 12/06 |
| | | | 726/6 |
| 2014/0380222 | A1 * | 12/2014 | Smith ............... G06Q 10/1095 |
| | | | 715/772 |

(Continued)

*Primary Examiner* — Rashawn N Tillery
(74) *Attorney, Agent, or Firm* — Edell, Shapiro & Finnan, LLC

(57) ABSTRACT

In one example, a server displays one or more meeting scheduling categories in a given organizational structure. The server receives, from a user, target meeting scheduling parameters corresponding to the one or more meeting scheduling categories. The server dynamically adjusts an appearance of the one or more meeting scheduling categories in the given organizational structure to reflect the target meeting scheduling parameters, and generates one or more meeting invitations including the target meeting scheduling parameters.

20 Claims, 11 Drawing Sheets

(56) References Cited

U.S. PATENT DOCUMENTS

2015/0185996 A1* 7/2015 Brown ................ G06F 3/04817
　　　　　　　　　　　　　　　　　　　715/706
2016/0357371 A1* 12/2016 Lee ....................... G06F 3/0482
2020/0349275 A1* 11/2020 Milton ................ G06F 21/6245

* cited by examiner

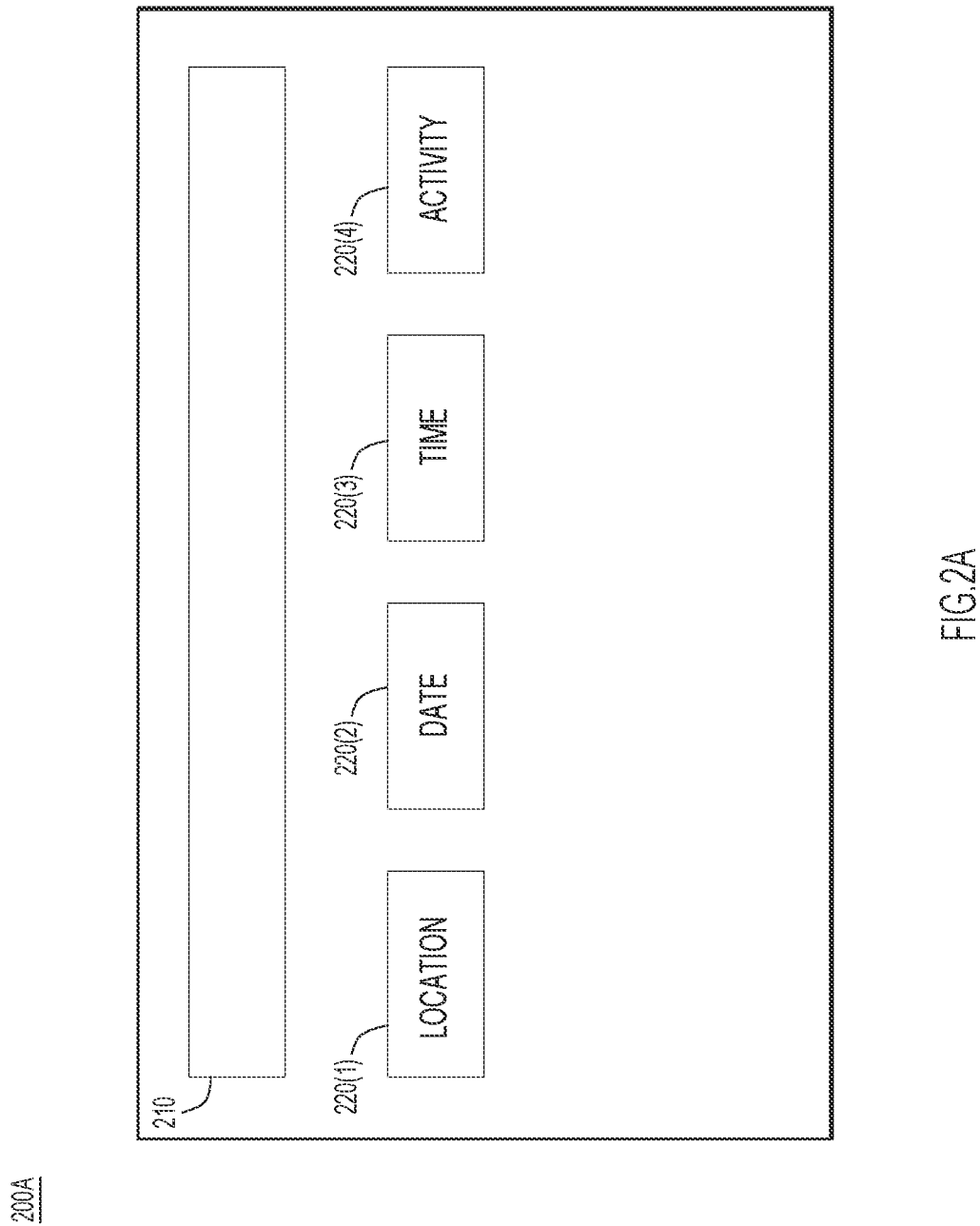

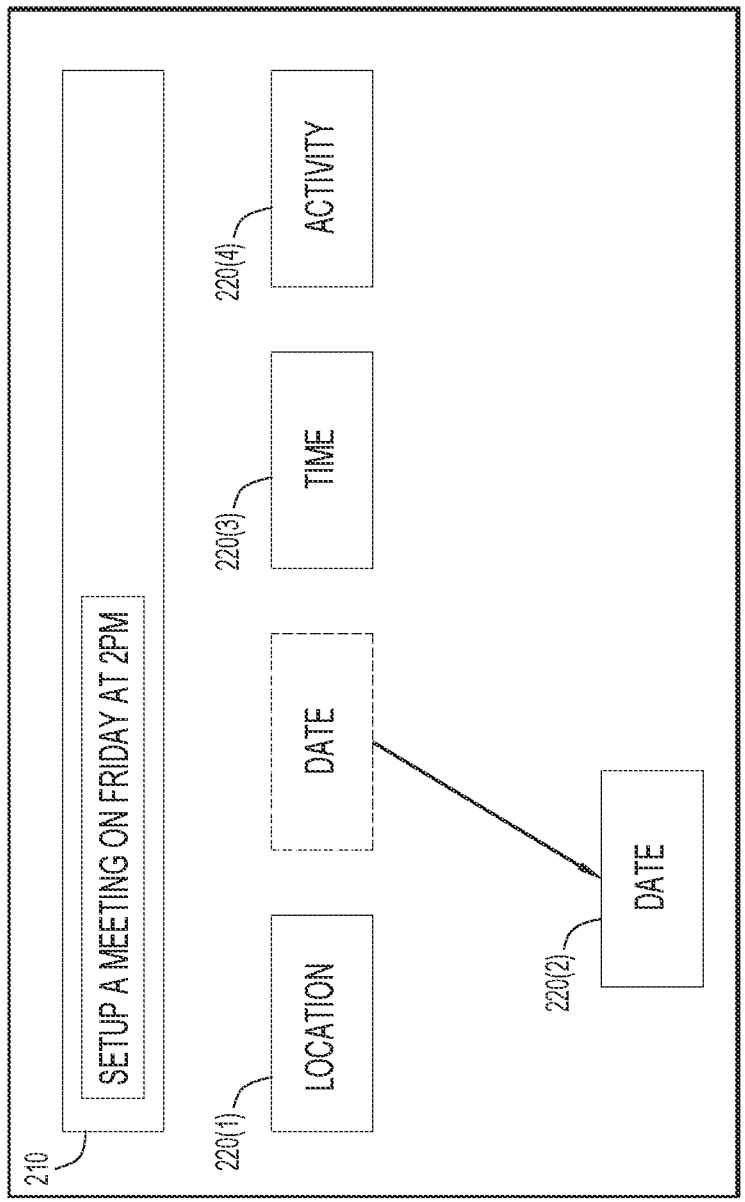

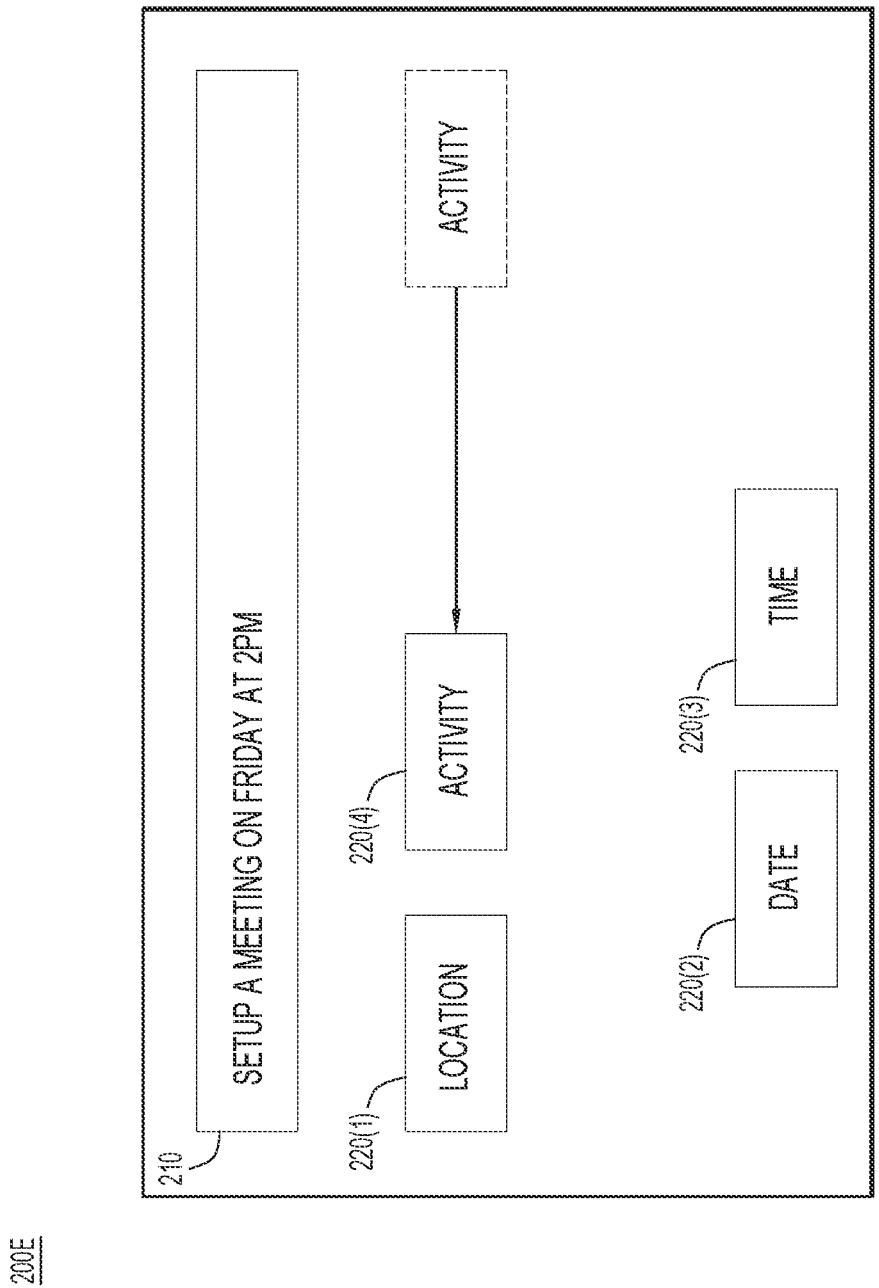

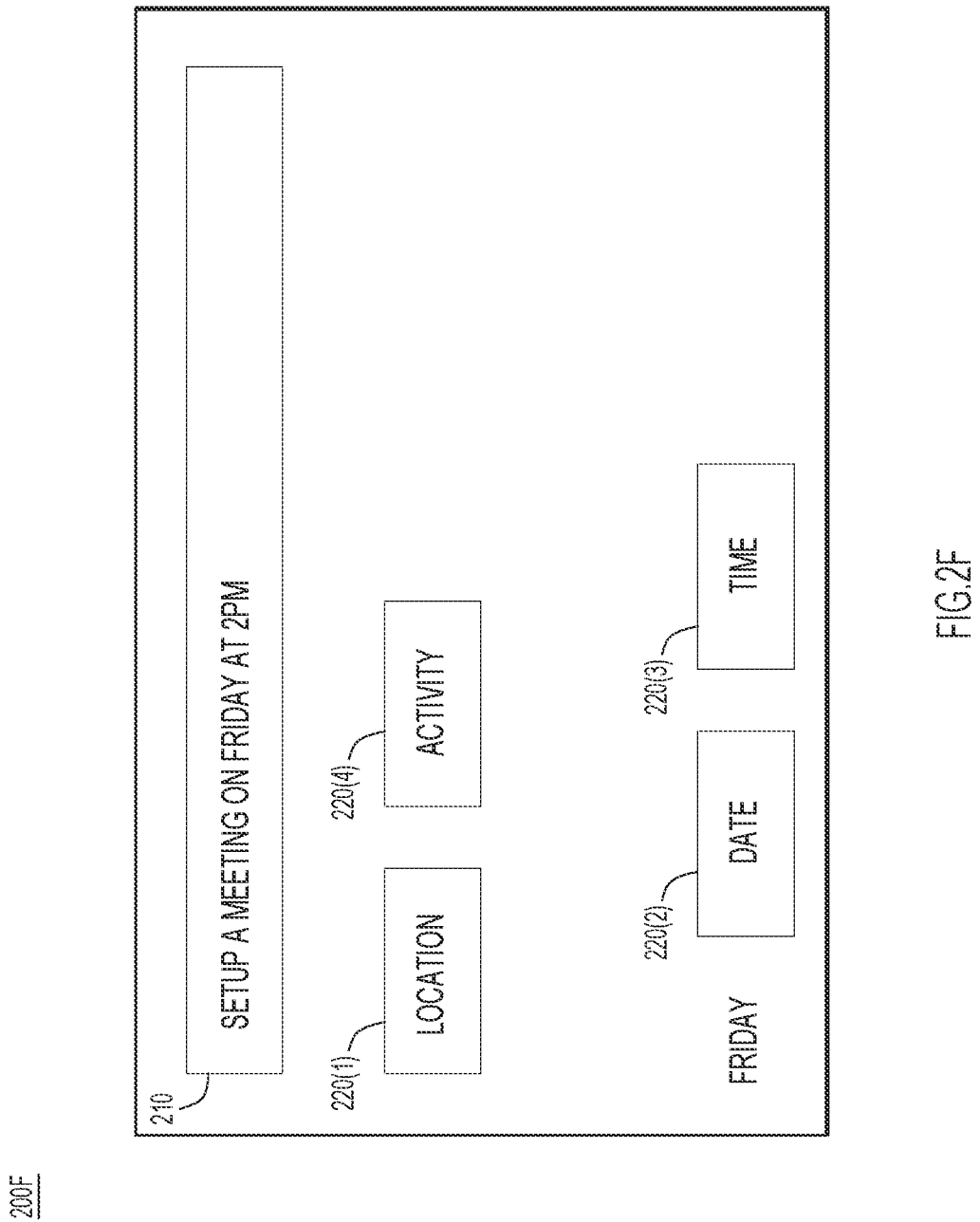

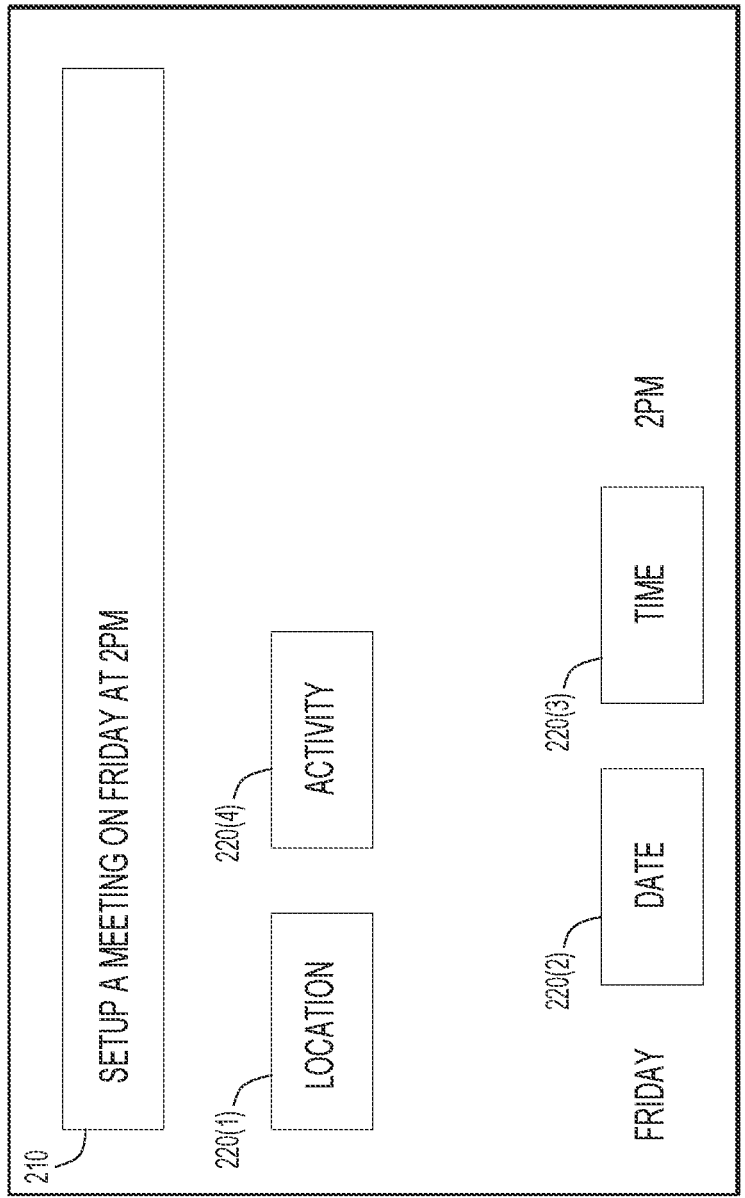

US 11,188,881 B2

DYNAMIC USER INTERFACE

CROSS REFERENCE TO RELATED APPLICATION

This application claims the benefit of U.S. Provisional Application No. 62/748,708 filed Oct. 22, 2018, the entirety of which is incorporated herein by reference.

TECHNICAL FIELD

The present disclosure relates to user interface technology.

BACKGROUND

Professionals throughout various industries often spend excess time and resources manually organizing meetings with colleagues and/or customers via standard communication channels such as email, text, within a Customer Relationship Management (CRM) application, social media, etc. Moreover, user interfaces are often difficult for users to navigate. Users of complex systems often have different use cases that are desired to be implemented, and user interfaces are often not intuitive for accomplishing such use cases. These factors lead to inefficiencies and user frustration, and also negatively impact productivity.

BRIEF DESCRIPTION OF THE DRAWINGS

FIGS. 2A-2G illustrate snapshots at various points in time of a dynamic user interface configured to visually filter unknown meeting scheduling parameters, according to an example embodiment.

DESCRIPTION OF EXAMPLE EMBODIMENTS

Overview

In one example embodiment, a server displays one or more meeting scheduling categories in a given organizational structure. The server receives, from a user, target meeting scheduling parameters corresponding to the one or more meeting scheduling categories. The server dynamically adjusts an appearance of the one or more meeting scheduling categories in the given organizational structure to reflect the target meeting scheduling parameters, and generates one or more meeting invitations including the target meeting scheduling parameters.

Example Embodiments

Figure 1:
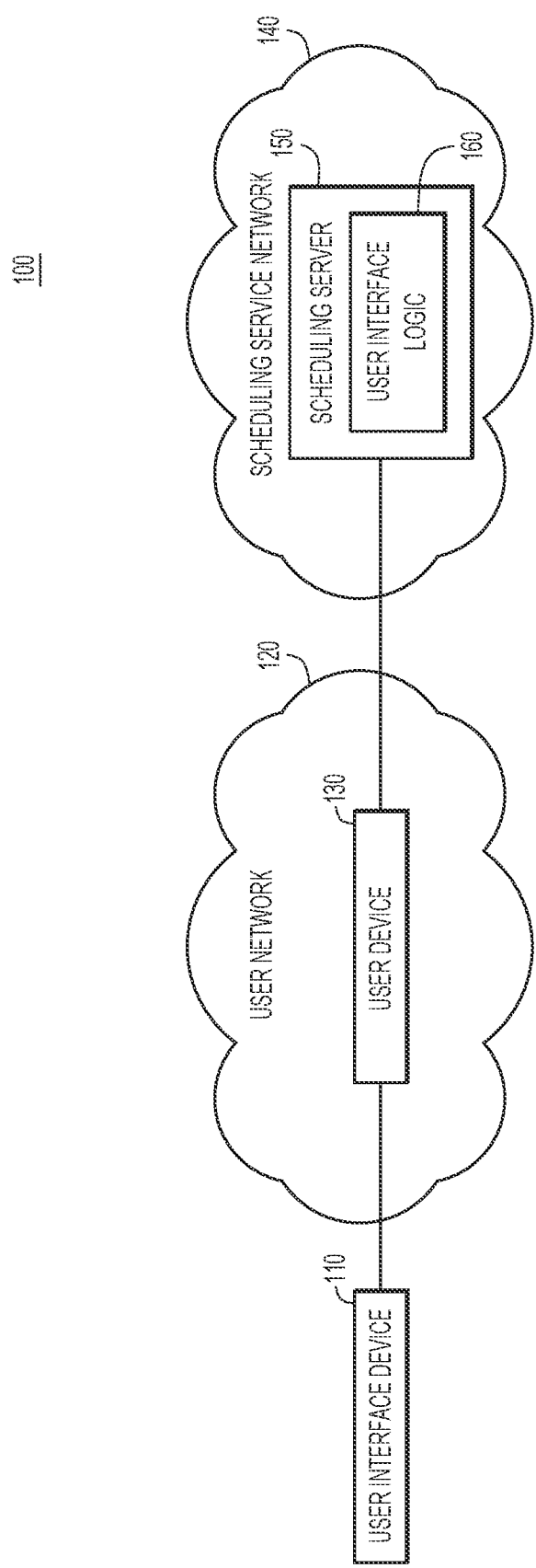
FIG. 1 illustrates a system configured to dynamically re-arrange a user interface based on user input, according to an example embodiment.

FIG. 1 illustrates an example system 100 configured to dynamically re-arrange a user interface based on user input. The system includes user interface device 110, user network 120 including user device 130, and scheduling service network 140 including scheduling server 150. User network 120 may be a personal (e.g., home) network or an enterprise (e.g., business) network. User device 130 may be a personal computer, laptop, smartphone, etc. User interface device 110 may include a screen, keyboard, mouse and/or other devices that enable a user of user device 130 to interact with user device 130. User interface device 110 may be integrated with user device 130 or externally wired or wirelessly connected.

In this example, the user wishes to schedule a meeting electronically. Conventionally, the user would need to enter meeting criteria into one or more fixed fields. Since these fields are fixed in nature, it may be difficult for a user to distinguish between known meeting scheduling parameters (e.g., meeting scheduling parameters that have been specified by the user) and unknown meeting scheduling parameters (e.g., meeting scheduling parameters that have not yet been specified by the user). As a result, a user might attempt to send an initial meeting invitation before all the meeting scheduling parameters have been appropriately specified. In this case, the user may be required to send out one or more subsequent meeting invitations to include the additional meeting scheduling parameters that were inadvertently left out. Sending these subsequent meeting invitations can waste valuable computing and other resources in one or more networks (e.g., memory, processors, bandwidth, etc.). In addition, it can be unclear when the user is providing insufficient information to execute a use case, especially when natural language techniques are employed.

Furthermore, users find themselves faced with complex tasks (e.g., meeting scheduling) that require navigation through not one but often many static menus and screens, such as hierarchical menu structures, to execute a use case. If a user wants to perform a set of actions that requires them to navigate these static menus and screens, the user would traditionally be sent to a help portal with a tutorial that would try to show the user which steps to complete. Since these menus are static in nature, it may be difficult for a user to identify which action(s) to complete and in what order. As a result, a user might spend an undue amount of time, and waste valuable computing resources (e.g., memory, processors, bandwidth, etc.), in completing the desired action(s).

Accordingly, scheduling server 150 includes user interface logic 160 to reduce the aforementioned inefficient use of computing and other resources. In one example, scheduling server 150 displays one or more meeting scheduling categories in a given organizational structure. Scheduling server 150 receives, from the user, a voice- or text-based input that indicates target meeting scheduling parameters corresponding to the one or more meeting scheduling categories. Scheduling server 150 dynamically rearranges the one or more meeting scheduling categories in the given organizational structure to reflect the input, and generates one or more meeting invitations including the target meeting scheduling parameters.

Thus, scheduling server 150 may determine/understand the input that the user has provided through Natural Language Processing (NLP) or similar techniques. Scheduling server 150 may further determine whether any additional input is needed to achieve a desired task (e.g., generating one or more meeting invitations). Scheduling server 150 may rearrange the user interface to fill any outstanding gaps that may be unclear/ambiguous or missing from the user input. In other examples, some or all of user interface logic 160 may reside on user device 130, one or more other servers, etc. In general, any entity (e.g., user device, scheduling server, backend server, etc.) may perform one or more of the operations described herein.

In one example, a backend server may allow an enterprise to establish scheduling parameters with which end users may schedule subsequent meetings. The backend server may display one or more meeting scheduling categories in a given organizational structure to a user associated with the enterprise. The backend server may receive, from the user associated with the enterprise, target meeting scheduling parameters corresponding to the one or more meeting scheduling categories. For example, the target meeting scheduling parameters may include a location of a new enterprise branch. The backend server may dynamically rearrange the one or more meeting scheduling categories in the given organizational structure to reflect the target meeting scheduling parameters. This may ensure the user associated with the enterprise correctly provides all the desired information. The backend server may store the target meeting scheduling parameters for later use.

Subsequently, an end user who wishes to establish a meeting at the new enterprise branch may contact the backend server and cause the backend server to generate one or more meeting invitations including the target meeting scheduling parameters (e.g., the new enterprise branch location). For example, the backend server may auto-populate a meeting invitation template with the location information of the new branch in response to an end user selection of the new branch. The backend server may further send (e.g., cause to be sent) the meeting invitation with the new enterprise branch location to the end user. The end user may accept the meeting invitation such that the meeting invitation is automatically integrated into an electronic calendar of the user, for example.

FIGS. 2A-2G illustrate example snapshots 200A-200G at various points in time of a dynamic user interface configured to visually filter unknown meeting scheduling parameters using icons on a per-use case basis. In this example, scheduling server 150 generates on user interface device 110 (e.g., via user device 130) the dynamic user interface to visually filter or highlight unknown or unspecified meeting scheduling parameters. User device 130 may display the dynamic user interface on user interface device 110.

The dynamic user interface may enable the user to clearly distinguish between known and unknown meeting scheduling parameters, thereby empowering the user to correctly specify all meeting scheduling parameters before sending the initial meeting invitation. This lowers the likelihood that the user will need to send subsequent meeting invitations with additional meeting scheduling parameters, and therefore reduces burden on computing resources that would otherwise be allocated for sending the subsequent meeting invitations. This effect may be particularly noticeable at scale.

FIG. 2A illustrates a snapshot 200A of the dynamic user interface at a first point in time. The dynamic user interface includes a text box 210 and four icons 220(1)-220(4) initially displayed in first region of the dynamic user interface (here, an upper region of the dynamic user interface). Icons 220(1)-220(4) indicate respective meeting scheduling categories (i.e., location, date, time, and activity). It will be appreciated that other types of meeting scheduling parameters (e.g., meeting attendees, etc.) may also/alternatively be displayed.

Figure 2B:
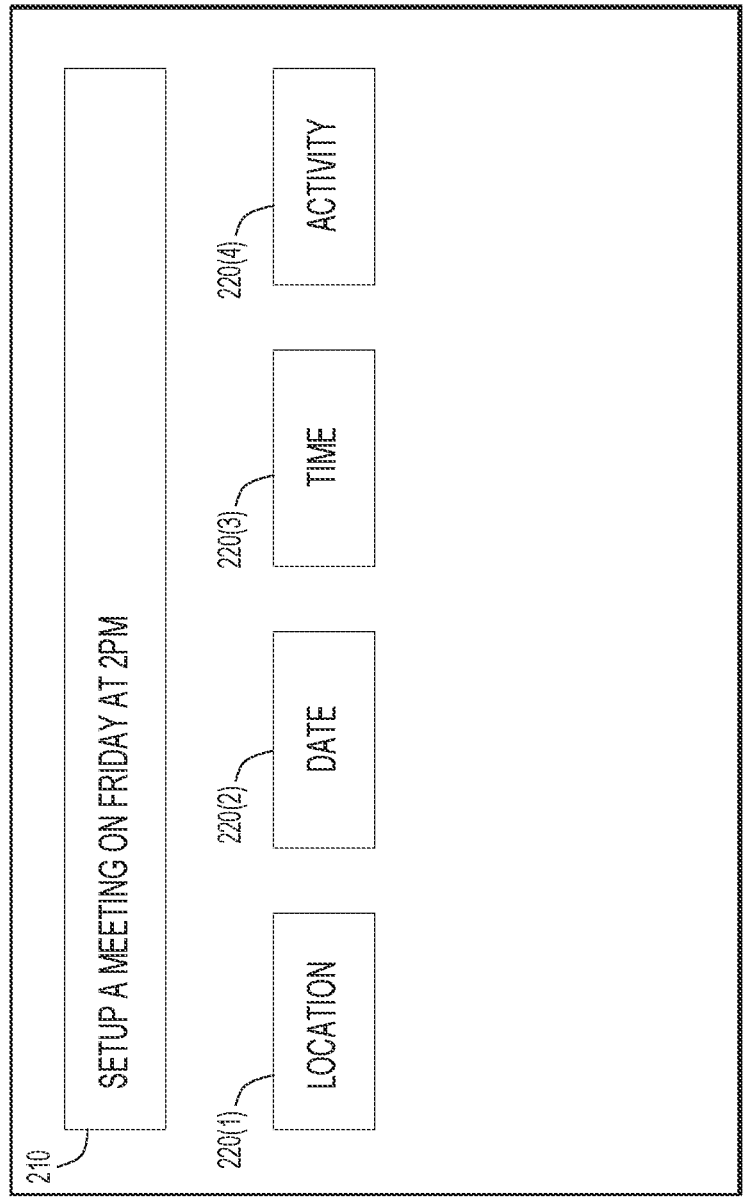

FIG. 2B illustrates a snapshot 200B of the dynamic user interface at a point in time subsequent to snapshot 200A. As shown, a user has provided a natural language input ("Setup a meeting on Friday at 2 PM") in text box 210. The user may input this text via user interface device 110. Scheduling server 150 may receive the natural language input and automatically extract the text using NLP techniques. Scheduling server 150 interprets "Friday" as a meeting scheduling parameter corresponding to the date meeting category and therefore determines that the date is a known meeting scheduling category. In response, scheduling server 150 causes user device 130 to visually distinguish the date meeting category from the unknown meeting scheduling categories.

FIG. 2C illustrates an example snapshot 200C of the dynamic user interface at a point in time subsequent to snapshot 200B. As shown, scheduling server 150 moves icon 220(2), which corresponds to the date meeting category, to a second region of the dynamic user interface (here, a lower region of the dynamic user interface). This may be in response to scheduling server 150 determining that the date is a known meeting scheduling category.

Figure 2D:
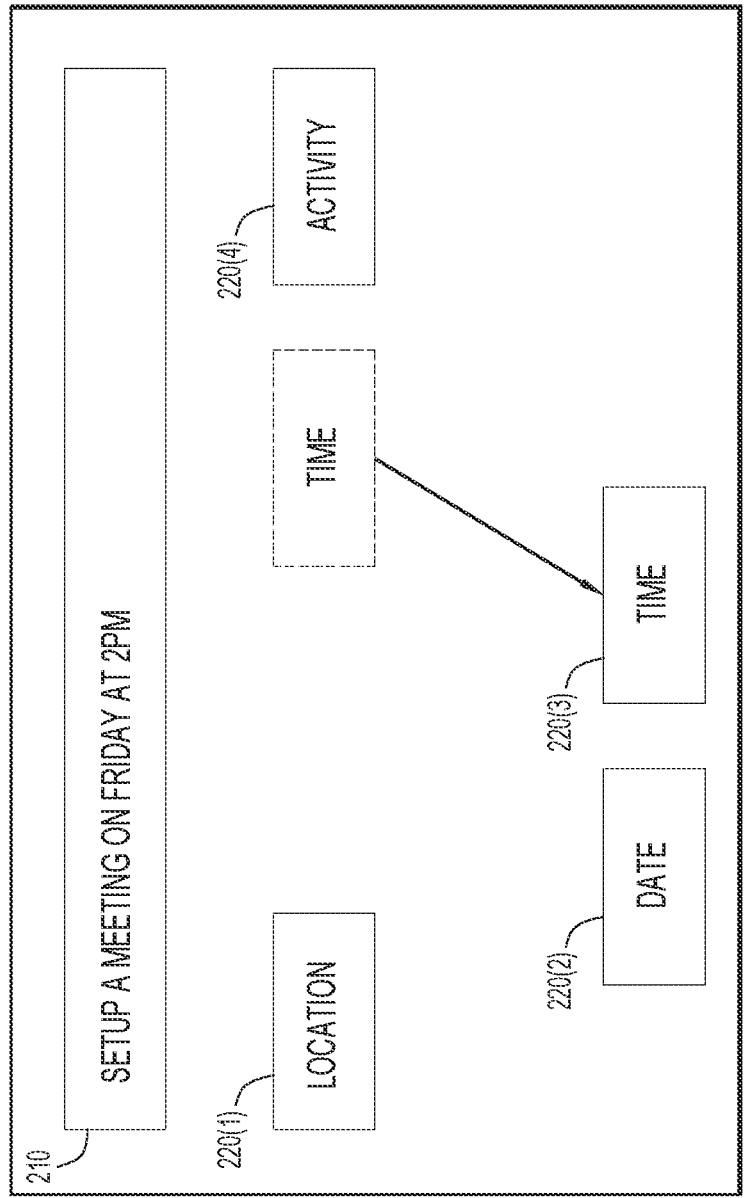

FIG. 2D illustrates an example snapshot 200D of the dynamic user interface at a point in time subsequent to snapshot 200C. Scheduling server 150 also interprets "2 PM" as a meeting scheduling parameter corresponding to the time meeting category for the meeting and therefore determines that the time is a known meeting scheduling parameter. In response, scheduling server 150 causes user device 130 to distinguish the time meeting category from the unknown meeting categories. As shown, scheduling server 150 moves icon 220(3), which corresponds to the time meeting scheduling category, to the second region of the dynamic user interface (here, a lower region of the dynamic user interface). This may be in response to scheduling server 150 determining that the time is a known meeting scheduling category.

FIG. 2E illustrates an example snapshot 200E of the dynamic user interface at a point in time subsequent to snapshot 200D. As shown, the icon 220(4), which corresponds to the activity meeting scheduling category, remains near the upper region of the dynamic user interface, but moves closer to icon 220(1). Thus, icons 220(2) and 220(3) (known meeting scheduling categories) are positioned together near the bottom of the dynamic user interface, and icons 220(1) and 220(4) (unknown meeting scheduling categories) are positioned together near the top of the dynamic user interface. This indicates to the user which missing information should be selected/provided in order to achieve a desired outcome.

FIG. 2F illustrates an example snapshot 200F of the dynamic user interface at a point in time subsequent to snapshot 200E. As shown, scheduling server 150 causes the dynamic user interface to display a target meeting scheduling parameter ("Friday") local to corresponding icon 220(2). This may signal to the user that the scheduling server interpreted "Friday" as corresponding to the date meeting scheduling category.

FIG. 2G illustrates an example snapshot 200G of the dynamic user interface at a point in time subsequent to snapshot 200F. As shown, scheduling server 150 causes the dynamic user interface to display a target meeting scheduling parameter (here, "2 PM") local to corresponding icon 220(3). This may signal to the user that the scheduling server interpreted "2 PM" as corresponding to the time meeting scheduling category.

It will be appreciated that operations depicted in FIGS. 2A-2G may occur in any suitable order. For example, the operations depicted in FIGS. 2C and 2D may be reversed or occur simultaneous to each other. Similarly, the operations depicted in FIGS. 2F and 2G may be reversed or occur simultaneous to each other. Furthermore, it will be appreciated that moving icons is just one example in which the user interface may be adjusted. Other examples include graying out icons, highlighting icons, changing the color of icons, adjusting the size of icons, causing the icons to hover, etc.

Figure 3:
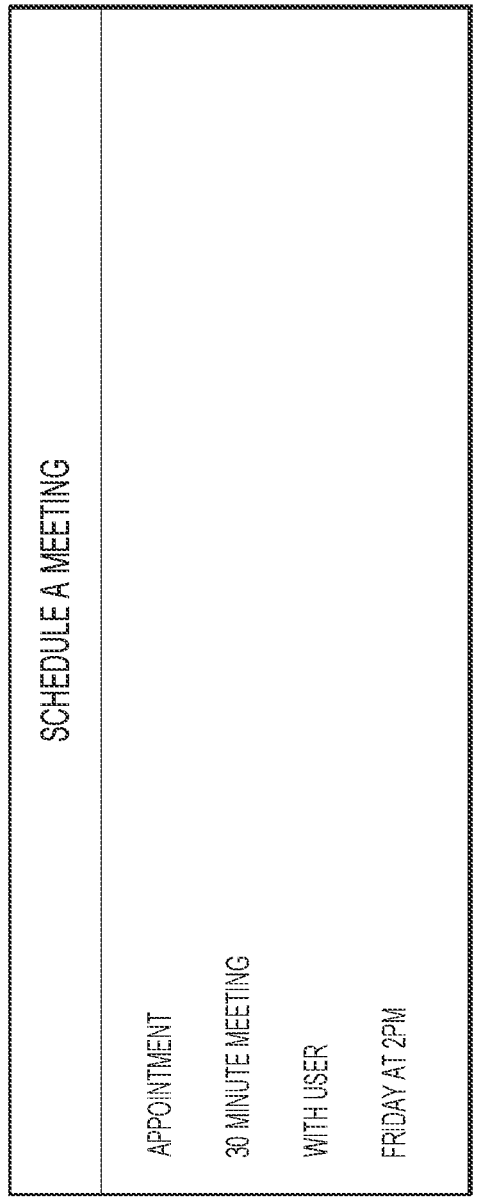
FIG. 3 illustrates a meeting invitation generated based on meeting scheduling parameters derived from a dynamic user interface, according to an example embodiment.

FIG. 3 illustrates an example meeting invitation 300. As shown, meeting invitation 300 specifies the user as a meeting attendee and includes the target date and time meeting scheduling parameters (Friday at 2 pm). Once the user has specified all target meeting scheduling parameters based on the dynamic user interface, scheduling server 150 may automatically generate one or more such meeting invitations for the user and any other meeting attendees. In one example, the user may send meeting invitation 300 to one or more of the meeting attendees. In another example, the scheduling server may automatically send meeting invitation 300 to one or more of the meeting attendees specified by the user in the dynamic user interface.

In another example, scheduling server 150 may display and dynamically rearrange one or more meeting scheduling categories in a hierarchical menu structure. An example hierarchical menu structure to navigate a product/service (e.g., meeting invitation generation) is provided as follows:
Category 1
    Feature 1
    Feature 2
Category 2
    Feature 3
    Feature 4
Category 3
    Feature 5
    Feature 6
    Feature 7

In one example, a text box is provided at the top of the menu that allows a user to input text (e.g., query or desired action relating to meeting invitation generation). Examples of the text may include "change all of my location schedules," "change my password," etc. For example, the user may wish to perform a set of actions associated with Features 1-4. The set of actions are to be performed in a specific order (e.g., Feature 3, Feature 4, Feature 2, Feature 1).

Scheduling server 150 may interpret the text using NLP techniques and map the text to a set of features in the user interface. Based on the text, scheduling server 150 may cause user device 130 to filter/reorganize/re-render/re-order/sort the hierarchical menu tree to display the set of steps and associated screens to service this request. For example, after scheduling server 150 has caused user device 130 to re-arrange the user interface, the user interface may appear as follows. As shown, Category 1 and Category 2 have switched spots. Feature 1 and Feature 2 have also switched spots.
Category 2
    Feature 3
    Feature 4
Category 1
    Feature 2
    Feature 1
Category 3
    Feature 5
    Feature 6
    Feature 7

In another example, only certain features may be visible (e.g., all categories and features below Feature 1 may disappear).

In another example, scheduling server 150 may display and dynamically rearrange a sequence of one or more meeting scheduling categories in a wizard interface. The wizard interface may initially as a wizard shown below:
Feature 1→Feature 2→Feature 3→Feature 4→Feature 5, . . .

The user may wish to perform a set of actions associated with Features 1-5 and input text to indicate as such. The set of actions are to be performed in a specific order (e.g., Feature 3, Feature 4, Feature 2, Feature 1). Scheduling server 150 may perform NLP operations on the text and cause user device 130 to re-arrange the user interface as follows:
Feature 3→Feature 4→Feature 2→Feature 1→Feature 5, . . .

Techniques described herein may simplify the understanding of complex products by organizing navigation around user requests. It will be appreciated that these techniques may apply to a variety of use cases, and that there may be many ways to re-arrange the user interfaces.

Figure 4:
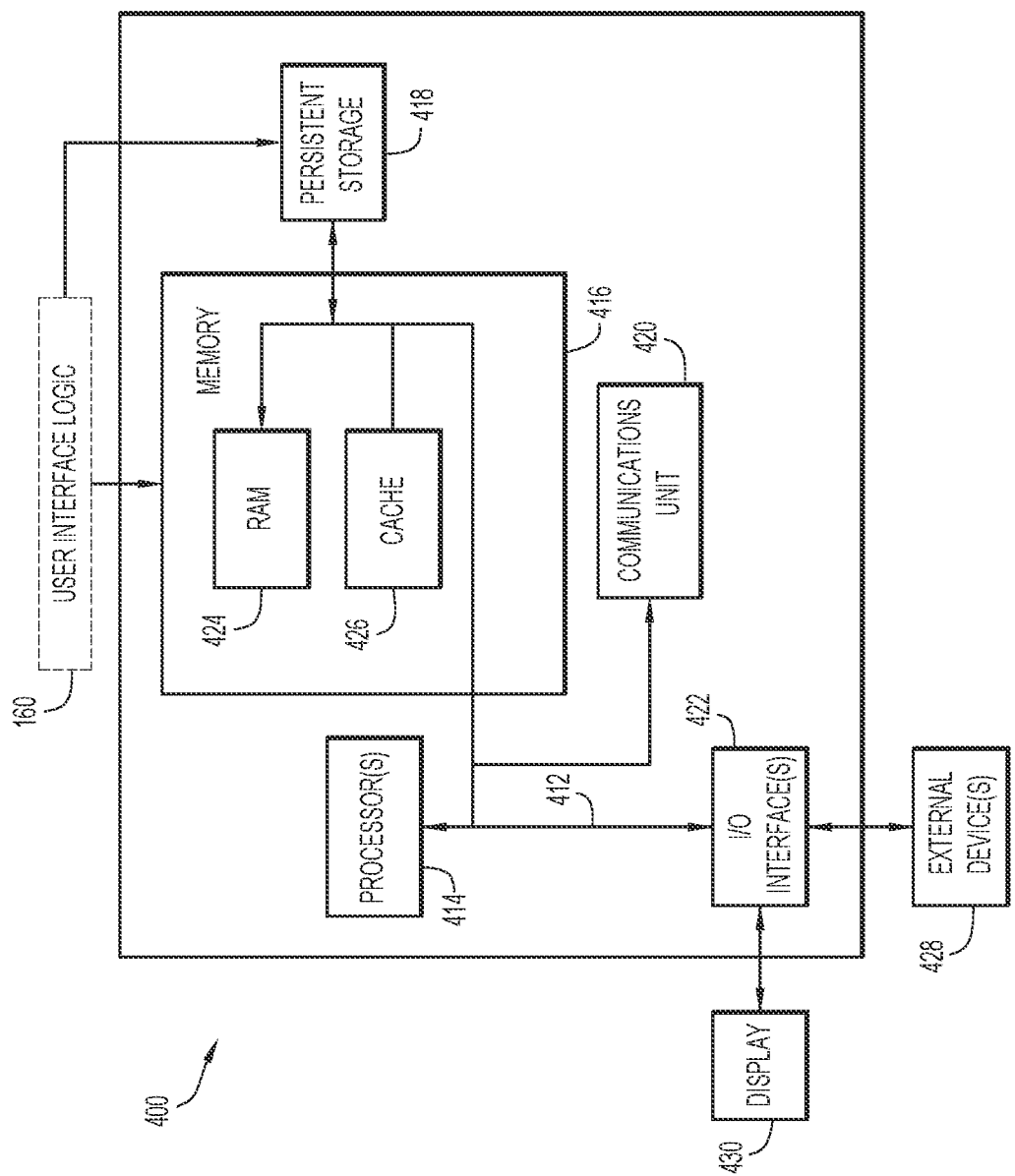
FIG. 4 is a block diagram of a computing device configured to dynamically re-arrange a user interface based on user input, according to an example embodiment.

FIG. 4 illustrates a hardware block diagram of an example device 400 (e.g., computing device) that may perform the functions of any of the servers or computing or control entities referred to herein in connection with providing a dynamic user interface based on user input (e.g., scheduling server 150, user device 130, etc.). It should be appreciated that FIG. 4 provides only an illustration of one embodiment and does not imply any limitations with regard to the environments in which different embodiments may be implemented. Many modifications to the depicted environment may be made.

As depicted, the device 400 includes a bus 412, which provides communications between computer processor(s) 414, memory 416, persistent storage 418, communications unit 420, and Input/Output (I/O) interface(s) 422. Bus 412 can be implemented with any architecture designed for passing data and/or control information between processors (such as microprocessors, communications and network processors, etc.), system memory, peripheral devices, and any other hardware components within a system. For example, bus 412 can be implemented with one or more buses.

Memory 416 and persistent storage 418 are computer readable storage media. In the depicted embodiment, memory 416 includes Random Access Memory (RAM) 424 and cache memory 426. In general, memory 416 can include any suitable volatile or non-volatile computer readable storage media. Instructions for user interface logic 160 may be stored in memory 416 or persistent storage 418 for execution by computer processor(s) 414.

One or more programs may be stored in persistent storage 418 for execution by one or more of the respective computer processors 414 via one or more memories of memory 416. The persistent storage 418 may be a magnetic hard disk drive, a solid state hard drive, a semiconductor storage device, read-only memory (ROM), Erasable Programmable Read-Only Memory (EPROM), flash memory, or any other computer readable storage media that is capable of storing program instructions or digital information.

The media used by persistent storage 418 may also be removable. For example, a removable hard drive may be used for persistent storage 418. Other examples include optical and magnetic disks, thumb drives, and smart cards that are inserted into a drive for transfer onto another computer readable storage medium that is also part of persistent storage 418.

Communications unit 420, in these examples, provides for communications with other data processing systems or devices. In these examples, communications unit 420 includes one or more network interface cards. Communications unit 420 may provide communications through the use of either or both physical and wireless communications links.

I/O interface(s) 422 allows for input and output of data with other devices that may be connected to device 400. For example, I/O interface(s) 422 may provide a connection to external devices 428 such as a keyboard, keypad, a touch screen, and/or some other suitable input device. External devices 428 can also include portable computer readable storage media such as database systems, thumb drives, portable optical or magnetic disks, and memory cards.

Software and data used to practice embodiments can be stored on such portable computer readable storage media and can be loaded onto persistent storage 418 via I/O interface(s) 422. I/O interface(s) 422 may also connect to a display 430. Display 430 provides a mechanism to display data to a user and may be, for example, a computer monitor.

Figure 5:
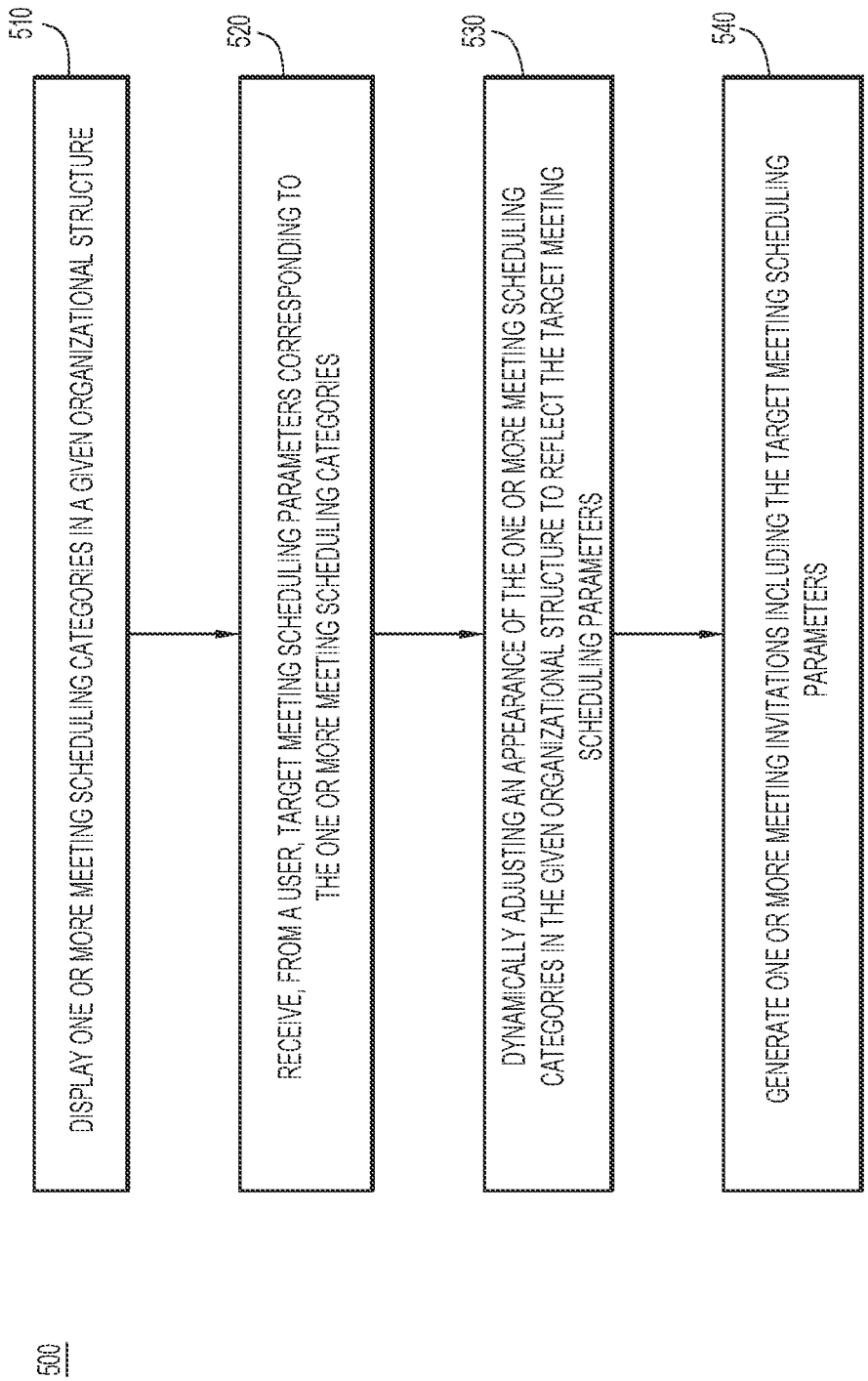
FIG. 5 is a flowchart of a method for dynamically re-arranging a user interface based on user input, according to an example embodiment.

FIG. 5 is a flowchart of a method 500 for providing a dynamic user interface based on user input. Method 500 may be performed by scheduling server 150 and/or user device 130, for example. At 510, one or more meeting scheduling categories are displayed in a given organizational structure. At 520, target meeting scheduling parameters corresponding to the one or more meeting scheduling categories are received from a user. At 530, an appearance of the one or more meeting scheduling categories in the given organizational structure is dynamically adjusted to reflect the target meeting scheduling parameters. At 540, one or more meeting invitations including the target meeting scheduling parameters are generated.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, Compact Disc ROM (CD-ROM), Digital Versatile Disk (DVD), memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, EPROM, Flash memory, a Static RAM (SRAM), a portable CD-ROM, a DVD, a memory stick, a floppy disk, a mechanically encoded device, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, Instruction-Set-Architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, Field-Programmable Gate Arrays (FPGA), or Programmable Logic Arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In one form, a method is provided. The method comprises: displaying one or more meeting scheduling categories in a given organizational structure; receiving, from a user, target meeting scheduling parameters corresponding to the one or more meeting scheduling categories; dynamically adjusting an appearance of the one or more meeting scheduling categories in the given organizational structure to reflect the target meeting scheduling parameters; and generating one or more meeting invitations including the target meeting scheduling parameters.

In one example, displaying the one or more meeting scheduling categories includes displaying one or more icons indicating the one or more meeting scheduling categories in a first region on a display; and dynamically adjusting the appearance of the one or more meeting scheduling categories includes moving the one or more icons to a second region on the display.

In a further example, the method further comprises displaying a target meeting scheduling parameter of the target meeting scheduling parameters local to a corresponding icon of the one or more icons. In another further example, the first region on the display is an upper region of the display, and the second region is a lower region of the display.

In one example, displaying the one or more meeting scheduling categories includes displaying the one or more meeting scheduling categories in a hierarchical menu structure; and dynamically adjusting the appearance of the one or more meeting scheduling categories includes dynamically adjusting the appearance of the one or more meeting scheduling categories in the hierarchical menu structure.

In one example, displaying the one or more meeting scheduling categories includes displaying a sequence of the one or more meeting scheduling categories in a wizard interface; and dynamically adjusting the appearance of the one or more meeting scheduling categories includes dynamically adjusting the appearance of the sequence of the one or more meeting scheduling categories in the wizard interface.

In one example, receiving the target meeting scheduling parameters includes receiving a voice- or text-based natural language input.

In another form, an apparatus is provided. The apparatus comprises: a network interface configured to send and/or receive network communications; and one or more processors coupled to the network interface, wherein the one or more processors are configured to: display one or more meeting scheduling categories in a given organizational structure; receive, from a user, target meeting scheduling parameters corresponding to the one or more meeting scheduling categories; dynamically adjust an appearance of the one or more meeting scheduling categories in the given organizational structure to reflect the target meeting scheduling parameters; and generate one or more meeting invitations including the target meeting scheduling parameters.

In another form, one or more non-transitory computer readable storage media are provided. The non-transitory computer readable storage media are encoded with instructions that, when executed by a processor, cause the processor to: display one or more meeting scheduling categories in a given organizational structure; receive, from a user, target meeting scheduling parameters corresponding to the one or more meeting scheduling categories; dynamically adjust an appearance of the one or more meeting scheduling categories in the given organizational structure to reflect the target meeting scheduling parameters; and generate one or more meeting invitations including the target meeting scheduling parameters.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   displaying one or more icons in a first region on a display, the one or more icons indicating one or more meeting scheduling categories in a given organizational structure;
   receiving, from a user, a user input identifying target meeting scheduling parameters corresponding to the one or more meeting scheduling categories;
   extracting the target meeting scheduling parameters from the user input;
   in response to extracting the target meeting scheduling parameters from the user input, automatically moving the one or more icons to a second region on the display;
   displaying a target meeting scheduling parameter of the target meeting scheduling parameters adjacent to a corresponding icon of the one or more icons; and
   generating one or more meeting invitations including the target meeting scheduling parameters.

2. The method of claim 1, wherein the first region on the display is an upper region of the display.

3. The method of claim 1, further comprising:
   displaying the one or more meeting scheduling categories in a hierarchical menu structure; and
   automatically adjusting an appearance of the one or more meeting scheduling categories in the hierarchical menu structure.

4. The method of claim 1, further comprising:
   displaying a sequence of the one or more meeting scheduling categories in a wizard interface; and
   automatically adjusting an appearance of the sequence of the one or more meeting scheduling categories in the wizard interface.

5. The method of claim 1, wherein receiving the user input includes receiving a voice-based natural language input.

6. An apparatus comprising:
   a network interface configured to send and/or receive network communications; and
   one or more processors coupled to the network interface, wherein the one or more processors are configured to:
   display one or more icons in a first region on a display, the one or more icons indicating one or more meeting scheduling categories in a given organizational structure;
   receive, from a user, a user input identifying target meeting scheduling parameters corresponding to the one or more meeting scheduling categories;
   extract the target meeting scheduling parameters from the user input;
   in response to extracting the target meeting scheduling parameters from the user input, automatically move the one or more icons to a second region on the display;

display a target meeting scheduling parameter of the target meeting scheduling parameters adjacent to a corresponding icon of the one or more icons; and generate one or more meeting invitations including the target meeting scheduling parameters.

7. The apparatus of claim 6, wherein the first region on the display is an upper region of the display.

8. The apparatus of claim 6, wherein the one or more processors are further configured to:
   display the one or more meeting scheduling categories in a hierarchical menu structure; and
   automatically adjust an appearance of the one or more meeting scheduling categories in the hierarchical menu structure.

9. The apparatus of claim 6, wherein the one or more processors are further configured to:
   display a sequence of the one or more meeting scheduling categories in a wizard interface; and
   automatically adjust an appearance of the sequence of the one or more meeting scheduling categories in the wizard interface.

10. The apparatus of claim 6, wherein the one or more processors are configured to:
    receive a voice-based natural language input.

11. One or more non-transitory computer readable storage media encoded with instructions that, when executed by a processor, cause the processor to:
    display one or more icons in a first region on a display, the one or more icons indicating one or more meeting scheduling categories in a given organizational structure;
    receive, from a user, a user input identifying target meeting scheduling parameters corresponding to the one or more meeting scheduling categories;
    extract the target meeting scheduling parameters from the user input;
    in response to extracting the target meeting scheduling parameters from the user input, automatically move the one or more icons to a second region on the display;
    display a target meeting scheduling parameter of the target meeting scheduling parameters adjacent to a corresponding icon of the one or more icons; and
    generate one or more meeting invitations including the target meeting scheduling parameters.

12. The one or more non-transitory computer readable storage media of claim 11, wherein the first region on the display is an upper region of the display.

13. The one or more non-transitory computer readable storage media of claim 11, wherein the instructions further cause the processor to:
    display the one or more meeting scheduling categories in a hierarchical menu structure; and
    automatically adjust an appearance of the one or more meeting scheduling categories in the hierarchical menu structure.

14. The one or more non-transitory computer readable storage media of claim 11, wherein the instructions further cause the processor to:
    display a sequence of the one or more meeting scheduling categories in a wizard interface; and
    automatically adjust an appearance of the sequence of the one or more meeting scheduling categories in the wizard interface.

15. The one or more non-transitory computer readable storage media of claim 11, wherein the second region is a lower region of the display.

16. The one or more non-transitory computer readable storage media of claim 11, wherein the instructions cause the processor to:
    receive a voice- or text-based natural language input.

17. The method of claim 1, wherein the second region is a lower region of the display.

18. The method of claim 1, wherein receiving the user input includes receiving a text-based natural language input.

19. The apparatus of claim 6, wherein the second region is a lower region of the display.

20. The apparatus of claim 6, wherein the one or more processors are configured to:
    receive a text-based natural language input.

* * * * *